United States Patent [19]
Ng et al.

[11] Patent Number: 6,131,096
[45] Date of Patent: *Oct. 10, 2000

[54] SYSTEM AND METHOD FOR UPDATING A REMOTE DATABASE IN A NETWORK

[75] Inventors: Mason Ng, Sunnyvale; Sean Michael Quinlan, San Francisco; Tom Ruan, Campbell; Daniel J. Mendez, Menlo Park; Jing Zhu; Martin Cheng, Jr., both of Fremont; Matt Williams, Palo Alto; Mark D. Riggins, San Jose, all of Calif.

[73] Assignee: Visto Corporation, Mountain View, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 09/167,044

[22] Filed: Oct. 5, 1998

[51] Int. Cl.[7] .................................................... G06F 17/30
[52] U.S. Cl. ............................ 707/10; 707/200; 709/206
[58] Field of Search ........................... 707/10, 3, 1, 200, 707/203; 709/206; 395/200.33

[56] References Cited

U.S. PATENT DOCUMENTS

| | | | |
|---|---|---|---|
| 5,386,564 | 1/1995 | Shearer et al. ............................ | 395/650 |
| 5,647,002 | 7/1997 | Brunson .................... | 380/49 |
| 5,666,530 | 9/1997 | Clark et al. ............................ | 395/617 |
| 5,710,918 | 1/1998 | Lagarde et al. ............................ | 707/10 |
| 5,721,914 | 2/1998 | DeVries .................................. | 395/615 |
| 5,729,735 | 3/1998 | Meyering .................................. | 707/10 |
| 5,745,360 | 4/1998 | Leone et al. ............................ | 364/140 |
| 5,758,354 | 5/1998 | Huang et al. .......................... | 707/201 |
| 5,951,652 | 9/1999 | Ingrassia et al. ........................ | 709/248 |
| 5,961,590 | 10/1999 | Mendez et al. .......................... | 709/206 |
| 5,966,714 | 10/1999 | Huang et al. .......................... | 707/201 |
| 5,968,131 | 2/2000 | Mendez et al. .......................... | 709/246 |
| 5,999,947 | 12/1999 | Zollinger et al. ........................ | 707/203 |
| 6,023,708 | 2/2000 | Mendez et al. ........................ | 707/203 |

OTHER PUBLICATIONS

Web site entitled "Bookmark Translator 2.0: This Utility transform Microsoft Internet Explore's bookmarks in the format valid for Netscape Navigator and viceversa," Enzo Marinacci, Rome—Jul. 1997, URL=http://www.bns.it/emware/BookmarkTranslator–uk.htm, pp. 1–4.

*Primary Examiner*—John Breene
*Assistant Examiner*—Greta Robinson
*Attorney, Agent, or Firm*—Squire, Sanders & Dempsey L.L.P.

[57] ABSTRACT

A system updates a remote (server) database in a network. The network comprises a global server coupled to a local client and to a remote client. The local client includes a browser for establishing a communications link with a web server on the global server. The global server has server database memory for storing independently modifiable copies of workspace data maintained by personal information managers (PIMS) or other data stores on the local client and has PIM Downloadables for interfacing with these PIMs. The local client requests synchronization capability for a particular PIM. The global server sends a PIM Downloadable corresponding to the particular PIM to the local client, which installs and initiates execution of the PIM Downloadable. Accordingly, a user interface receives information designating a database containing the workspace data to be synchronized and information selecting a synchronization mode such as one-way replace, one-way merge or two-way synchronize. A PIM interface instructs the particular PIM to retrieve the workspace data to be synchronized. A synchronization module determines update data based on the synchronization mode selected and possibly based on a comparison with the contents of the server database. A communications engine delivers the first update data to the global server, which updates the server database accordingly.

49 Claims, 9 Drawing Sheets

(Computer Network)

FIG. 1 (Computer Network)

(PIM Downloadable)

FIG. 5 (Replace)

FIG. 6 (Merge)

FIG. 7 (Two-way synchronization)

SYSTEM AND METHOD FOR UPDATING A REMOTE DATABASE IN A NETWORK

CROSS-REFERENCE TO RELATED APPLICATIONS

This application claims priority of and incorporates by reference U.S. patent application Ser. No. 08/766,307, entitled "System and Method for Globally Accessing Computer Services," filed on Dec. 13, 1996, by inventors Mark D. Riggins, et al; U.S. patent application Ser. No. 08/841, 950, entitled "System and Method for Enabling Secure Access to Services in a Computer Network, filed on Apr. 8, 1997, by inventor Mark D. Riggins; U.S. patent application Ser. No. 08/865,075, entitled "System and Method for Using a Global Translator to Synchronize Workspace Elements Across a Network," filed on May 29, 1997, by inventors Daniel J. Mendez, et al.; U.S. patent application Ser. No. 08/835,997, entitled "System and Method for Security Synchronizing Multiple Copies Of a Workspace Element in a Network," filed on Apr. 11, 1997, by inventors Daniel J. Mendez, et al.; U.S. patent application Ser. No. 08/897,888, entitled "System and Method for Synchronizing Electronic Mail Across a Network," filed on Jul. 22, 1997, by inventors Daniel J. Mendez, et al.; U.S. patent application Ser. No. 08/899,277, entitled "System and Method for Using an Authentication Applet to Identify and Authenticate a User in a Computer Network," filed on Jul. 23, 1997, by inventors Mark D. Riggins; U.S. patent application Ser. No. 08/903, 118, entitled "System and Method for Globally and Securely Accessing Unified Information in a Computer Network," filed on Jul. 30, 1997, by inventors Daniel J. Mendez, et al.; U.S. patent application Ser. No. 09/008,354, entitled "System and Method for Using a Workspace Data Manager to Access, Manipulate and Synchronize Network Data," filed Jan. 16, 1998, by inventor Daniel J. Mendez; and U.S. patent application Ser. No. 09/865,075, entitled "System and Method for Installing and Using a Temporary Certificate at a Remote Site," filed May 19, 1998, by inventor Mark Riggins.

BACKGROUND OF THE INVENTION

1. Field of the Invention

This invention relates generally to computer networks, and more particularly provides a system and method for updating a remote database in a computer network.

2. Description of the Background Art

Data accessibility and consistency are significant concerns for computer users. For example, when a roaming user, i.e., a user who travels to a remote location, needs to review or manipulate data such as calendar or address information, the roaming user must either carry the data to the remote location or access a workstation remotely. Maintaining a true copy of a database is a cumbersome process. Accordingly, system designers have developed an array of techniques for connecting a remote terminal across a computer network to the workstation storing the data.

To guarantee readability of the downloaded data, the user must carry a laptop computer containing all the applications needed to present and enable manipulation of the downloaded data, or find a network-connected computer that contains the needed application programs. Further, the user must maintain a record of all identification and authentication information for each database site that the user wishes to access.

Thus, a system and method are needed to enable a roaming user to access personal information stored on a remote database easily from any site connected via a network. And, to make such a system easy to use and facilitate the population of the remote database,, a system and method are needed for easily moving workspace data (such as in a PIM) from the user's local data store to the remote data store in a manner that advantageously uses existing infrastructure such as browser technology and the Internet communications infrastructure.

SUMMARY OF THE INVENTION

The present invention provides a system and method for updating a remote database in a computer network. The computer network comprises a global server coupled to a local client and to a remote client. The local client uses a browser for establishing a communications link with a web server on the global server. The global server has memory for storing independently modifiable copies of workspace data (such as files, e-mails, calendar information, etc.) maintained by Personal Information Managers (PIMs) on the local client, and has PIM Downloadables for interfacing with these PIMs.

The local client requests synchronization capability for a particular PIM. The global server sends a PIM Downloadable corresponding to the particular PIM to the local client, which installs and initiates execution of the PIM Downloadable. Accordingly, a user interface receives information designating workspace data to be synchronized and information selecting a synchronization mode such as one-way replace, one-way merge or two-way synchronize. A PIM interface instructs the particular PIM to retrieve the workspace data to be synchronized. A synchronization module determines update data based on the synchronization mode selected and possibly based on an actual comparison with the corresponding workspace data copy on the global server. A communications engine delivers the first update data to the global server, which updates the server workspace data.

A claimed system comprises a user interface for receiving information designating workspace data to be synchronized and for receiving information selecting a synchronization mode; a PIM interface for instructing a personal information manager (PIM) to retrieve the workspace data to be synchronized; a synchronization module coupled to the user interface and the PIM interface for determining first update data based on the workspace data to be synchronized and on the synchronization mode selected; and a communications engine coupled to the synchronization module for delivering the first update data to a server database.

Another claimed system comprises memory storing workspace data and a PIM Downloadable; a web server for establishing a communications link with a client; a personal information manager (PIM) Downloadable retrieval engine coupled to the memory for receiving a request for synchronization capability from the client, and for forwarding the PIM Downloadable which includes the synchronization capability to the client for installation; and a user data store manager coupled to the memory for receiving update data from the Downloadable, and for updating the workspace data based on the update data received.

A claimed method comprises the steps of receiving information designating workspace data to be synchronized; receiving information selecting a synchronization mode; instructing a personal information manager (PIM) to retrieve the workspace data to be synchronized; determining first update data based on the workspace data to be synchronized and on the synchronization mode selected; and delivering the first update data to a server database.

Another claimed method comprises the steps of storing workspace data and a Downloadable; establishing a communications link with a client; receiving a request for synchronization capability from a client; forwarding the Downloadable which includes the synchronization capability to the client for installation; receiving update data from the Downloadable; and updating the workspace data based on the update data received.

The system and method of the present invention may advantageously enable the synchronization or one-way import of data corresponding to particular PIMs across a network to a global server. The system and method enable the selection of a mode of synchronization or import. The system and method enable the automatic configuration of both a local client and a remote client to operate this invention. That is, since the PIM Downloadable is downloaded from the global server, the local client need only have a communications engine, such as that provided by a conventional browser, and a PIM to obtain synchronization or import capability.

DETAILED DESCRIPTION OF THE PREFERRED EMBODIMENT

The present invention provides a system and method for updating a network database to store current PIM data, which may be accessed from any remote site coupled to the network and operating a communications engine such as a web browser.

Figure 1:
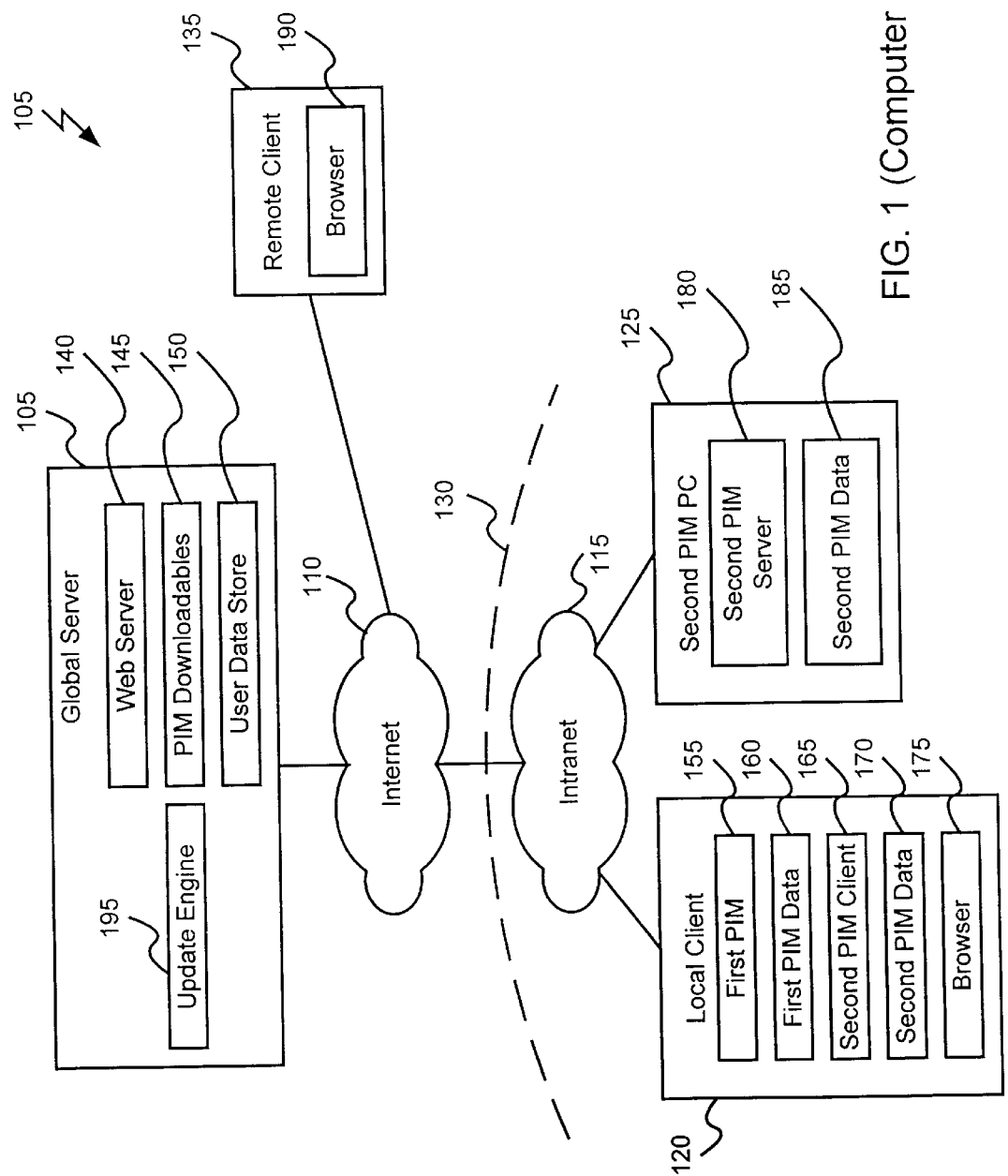
FIG. 1 is a block diagram illustrating a computer network in accordance with the present invention.

FIG. 1 is a block diagram illustrating a computer network 100, in accordance with the present invention. The computer network 100 includes a global server 105 coupled via a computer network, e.g., the Wide Area Network (WAN) commonly referred to as the Internet 110, to a Local Area Network (LAN) commonly referred to as an Intranet 115. A local client 120 and a calendar Personal Computer (PC) 125 are coupled to the Intranet 115. The Intranet 115, the local client 120 and the calendar PC 125 may be protected by a firewall 130. The global server 105 may be protected by a global firewall (not shown). The computer network 100 further includes a remote client 135 coupled to the Internet 110.

Figure 8:
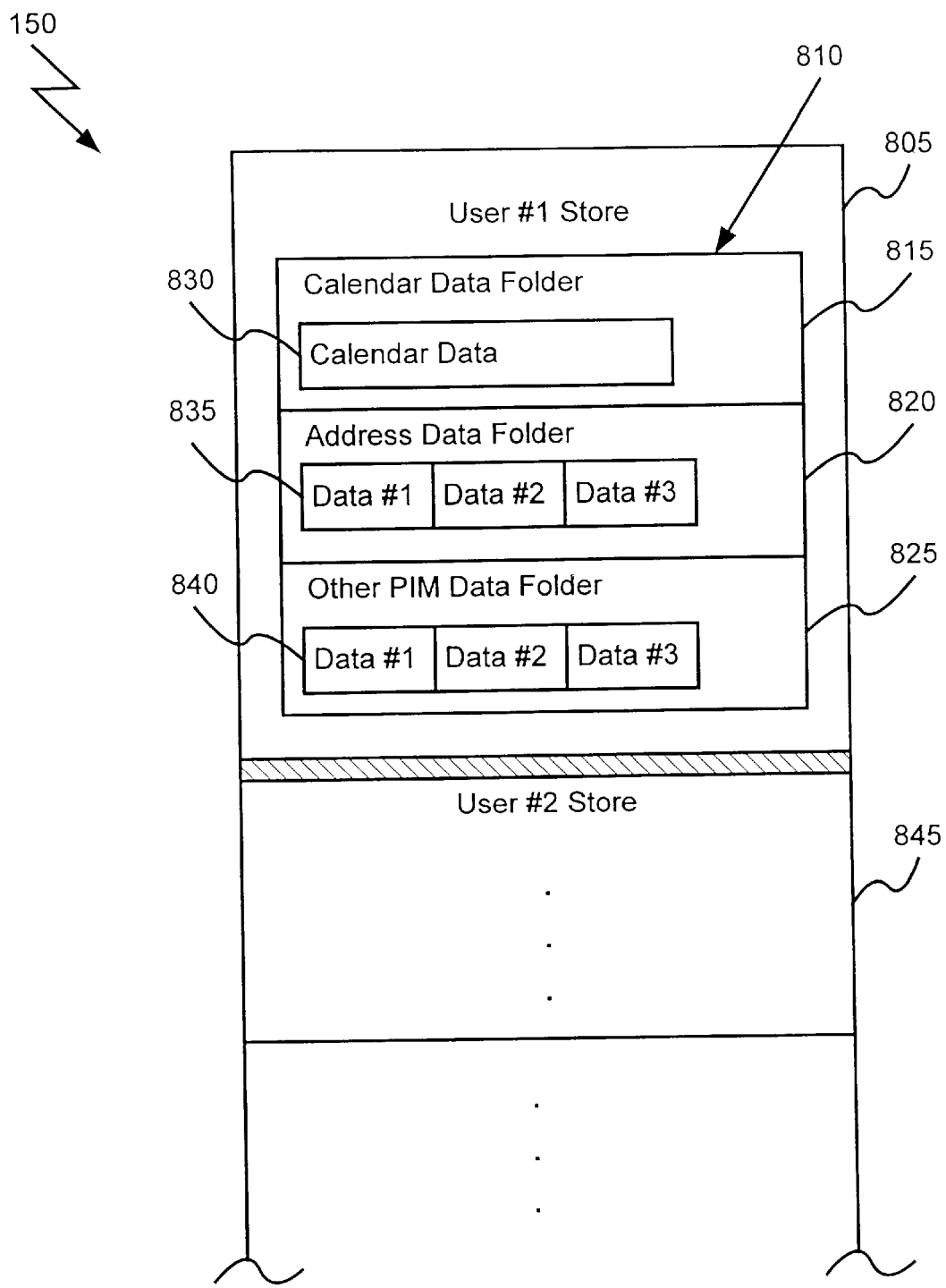
FIG. 8 is a block diagram illustrating details of the user data store of FIG. 1.

The global server 105 is a computer which includes a web server 140 for communicating with and responding to requests from web browsers. The global server 105 further includes a user data store 150 for storing user workspace data (files, calendar information, e-mails, bookmarks, etc.). FIG. 8 is a block diagram illustrating details of the user data store 150. User data store 150 may include a first store 805 for user#1, a second store 845 for user#2, etc. Further, each store 805, 845 may include separate folders for each program. For example, the first store may include a first folder 815 for calendar data, a second folder 820 for address data, a third folder 825 for other PIM data, etc. Still further, each folder 815, 820, 825 may include separate workspace databases as designated by the user. For example, the calendar data folder 815 may include a single calendar database 830 for a personal calendar; the address data folder 820 may include three separate databases 835 (one for business addresses, one for personal addresses, and one for miscellaneous addresses); and the other PIM data folder 825 may include three separate databases 840. It will be appreciated that, for synchronization purposes, individual records may be selected from one or more PIM workspace databases and recognized as a single database.

The global server 105 also includes PIM Downloadables 145. A Downloadable is executable or interpretable application code, which is downloaded from a source computer and run on a destination computer. For the case herein, the term "executable" includes "interpretable." A Downloadable is typically requested by an ongoing process such as by an Internet browser or web client. Examples of Downloadables include Java™ applets designed for use in the Java™ distributing environment developed by Sun Microsystems, Inc., JavaScript™ scripts also developed by Sun Microsystems, Inc., ActiveX™ controls designed for use in the ActiveX™ distributing environment developed by the Microsoft Corporation, and Visual Basic also developed by the Microsoft Corporation. Downloadables may also include plugins, which add to the functionality of an already existing application program. It will be appreciated that each Downloadable may include one or more applets, one or more ActiveX controls, one or more plugins, etc. or combinations thereof. It will be further appreciated that the Downloadable need not be deleted upon logoff. Each PIM Downloadable 145 may communicate with a corresponding PIM, and may communicate with the global server 105 to update the user data store 150. Details of a PIM Downloadable 145 are illustrated in FIG. 3.

The global server 105 further includes an update engine 195, which retrieves the appropriate PIM Downloadable and downloads it to the local client 105. The update engine 195 further responds to requests for retrieving and modifying workspace data contained in the user data store 150. The update engine is described in greater detail with reference to FIG. 3B.

The local client 120 is a computer which includes a browser 175 for communicating with the global server 105 via the web server 140. It will be appreciated that the browser 175 may include a conventional web browser. The local client 120 further includes a first PIM 155 and first PIM data 160. The first PIM 155 may include an calendar program for managing calendar data, an address book program for managing addresses, an e-mail program for controlling e-mails, a browser for controlling bookmarks, etc. Examples of the first PIM 155 include ACT! by Symantec Corporation, Lotus Organizers standalone organizer by the Lotus Development Corporation, Quicken™, PeopleSoft™, sales force automation information programs, generic file managers, etc. The local client further includes a second PIM client 165 for communicating with a second PIM server located on another computer which is connected to the local client 120, and second PIM data 170.

The second PIM PC 125 is a computer which includes a second PIM server 180 for responding to the requests made by the second PIM client 165. The second PIM server and interface may collectively provide calendar services, address services, e-mail services, etc. The second PIM PC 125 includes second PIM data 185 that is unique to second PIM data 170 stored on the local client 120. One skilled in the art will recognize that the second PIM 180 and second PIM client 165 may store second PIM data only on the local client 120, only on the second PIM PC 125, on both the local client 120 and the second PIM PC 125 collectively, or on both the local client 120 and the second PIM PC 125 redundantly. For example, with reference to e-mail servers, the second PIM PC 125 stores a copy of an e-mail received but downloads the copy to the local client 120 upon request by the e-mail server interface. Examples of the second PIM client 165 and server 180 include Outlook™ and Exchange™ by the Microsoft Corporation, Lotus Organizer® and Lotus Notes™ by the Lotus Development Corporation, GroupWise™ by Novell, Inc., etc.

The first PIM 155 knows the location of the first PIM data 160. The second PIM client 165 knows the location of the second PIM data 170 on the local client 120. The second PIM server 180 knows the location of the second PIM data 185 located on the second PIM PC 125. Thus, each component can retrieve its corresponding data.

The remote client 135 includes a browser 190, which can connect to the web server 140 of the global server 140 and can access, review and possibly manipulate workspace data stored in the user data store 150.

Figure 2:
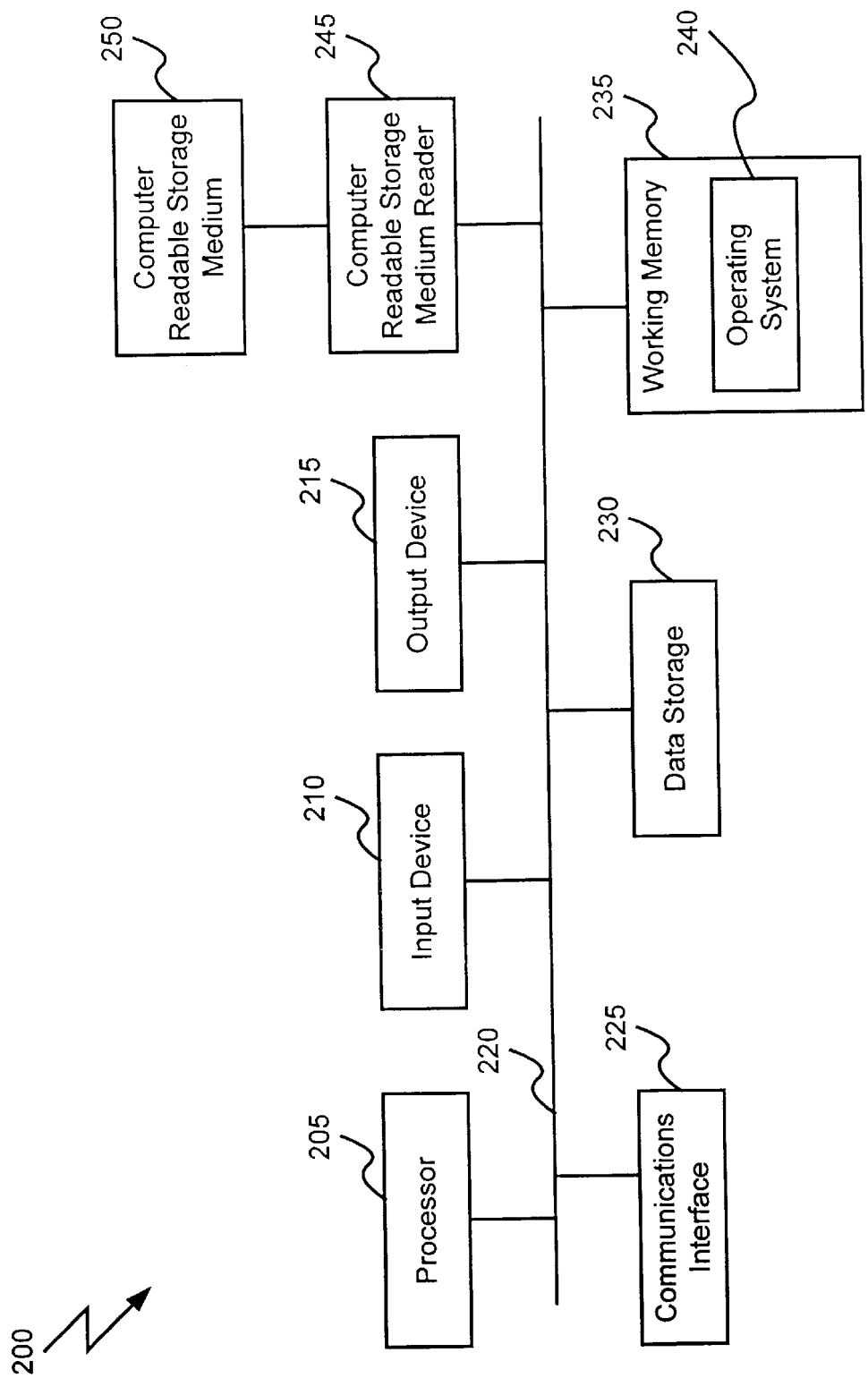
FIG. 2 is a block diagram illustrating details of a computer.

FIG. 2 is a block diagram illustrating a computer system 200 which illustrates details of each of the global server 105, the local client 120, the second PIM PC 125 and the remote client 135. The computer system 200 includes a processor 205, such as an Intel Pentium® microprocessor or a Motorola Power PC® microprocessor, coupled to a communications channel 220. The computer system 200 further includes an input device 210 such as a keyboard and mouse, an output device 215 such as a Cathode Ray Tube (CRT) display, a communications device 225, data storage 230 such as a magnetic disk, and working memory 235 such as Random-Access Memory (RAM), each coupled to the communications channel 120. The communications channel 220 may be coupled to a network such as the to the Internet 110 or to the Intranet 115. One skilled in the art will recognize that, although the data storage 230 and working memory 235 are illustrated as separate units, data storage 230 and working memory can be integrated or partially integrated units.

An operating system 240 controls processing by the processor 205, and is typically stored in data storage 230 and loaded into working memory 235 (as illustrated) for execution. Other programs such as browsers, servers, downloadables, data, etc. may also be stored in data storage 230 and loaded into working memory 235 (as illustrated) for execution by processor 205.

One skilled in the art will recognize that the computer system 200 may also include additional information, such as network connections, additional memory, additional processors, LANs, input/output lines for transferring information across a hardware channel, the Internet or an Intranet, etc. One skilled in the art will also recognize that the programs and data may be received by and stored in the system in alternative ways. For example, a computer-readable storage medium (CRSM) reader 245 such as a floppy disk drive, hard disk drive, CD-ROM reader, magneto-optical reader, CPU (for RAM), etc. may be coupled to the communications channel 220 for reading a computer-readable storage medium (CRSM) 250 such as a magnetic disk, a hard disk, a magneto-optical disk, RAM, etc. Accordingly, the system 200 may receive programs and data via the CRSM reader 240.

Figure 3A:
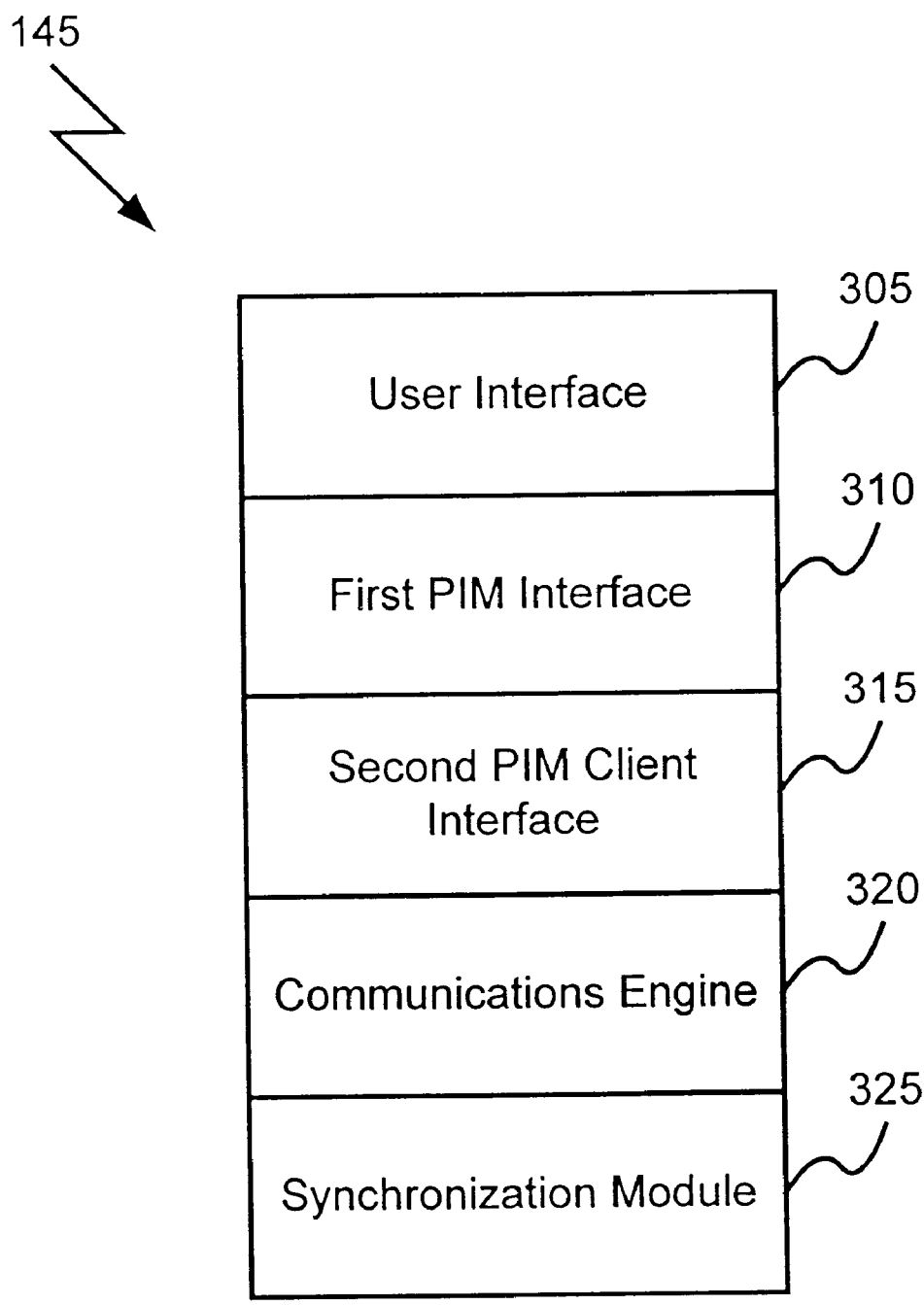
FIG. 3A is a block diagram illustrating details of the PIM downloadable of FIG. 1.

FIG. 3A is a block diagram illustrating details of a PIM Downloadable 145. Each PIM Downloadable 145 includes a user interface 305, a first PIM Application Program Interface (API) 310, a second PIM client interface 315, a communications engine 320 and a synchronization module 325.

Figure 5:
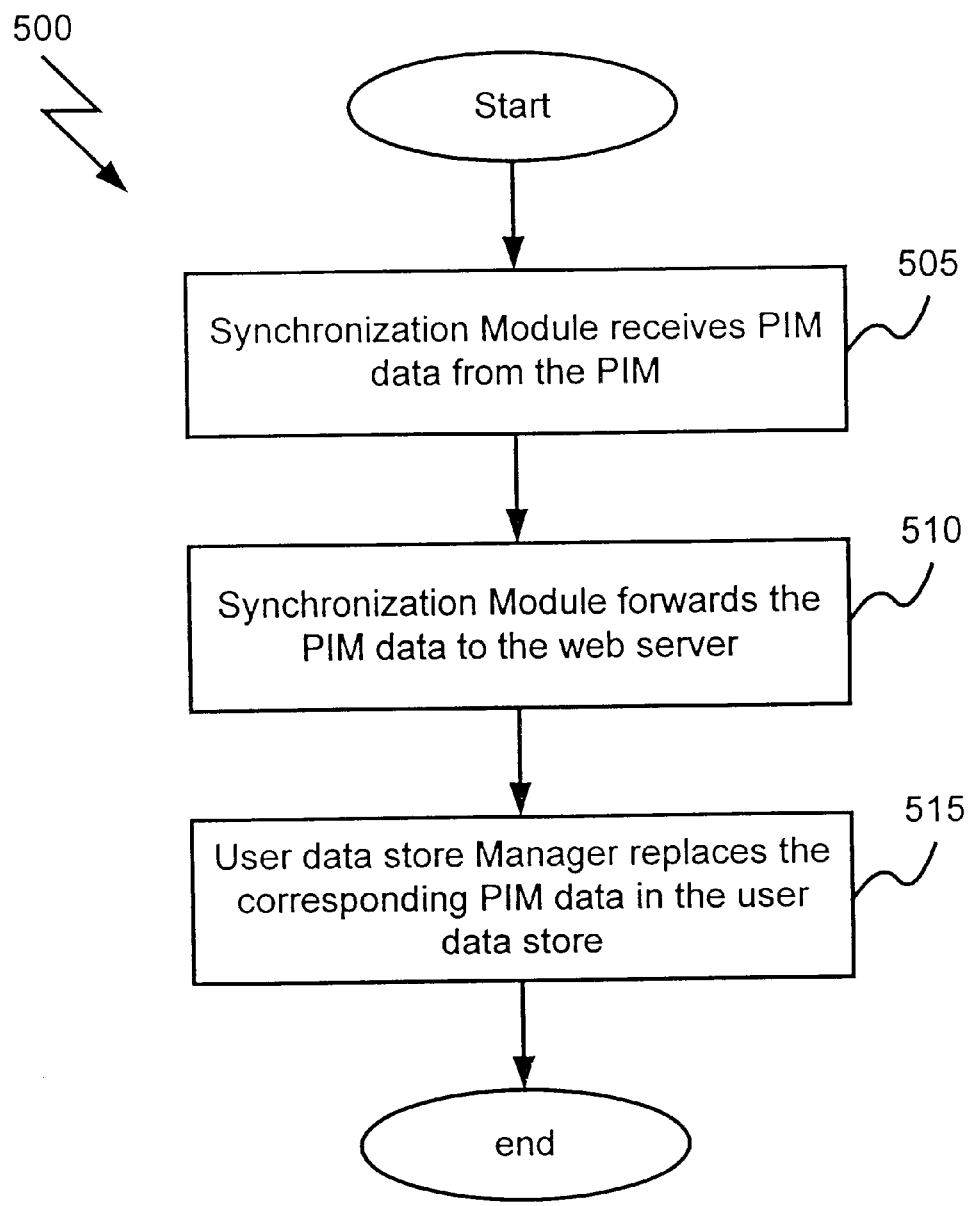
FIG. 5 is a flowchart illustrating the synchronization mode of one-way data replacing.
Figure 6:
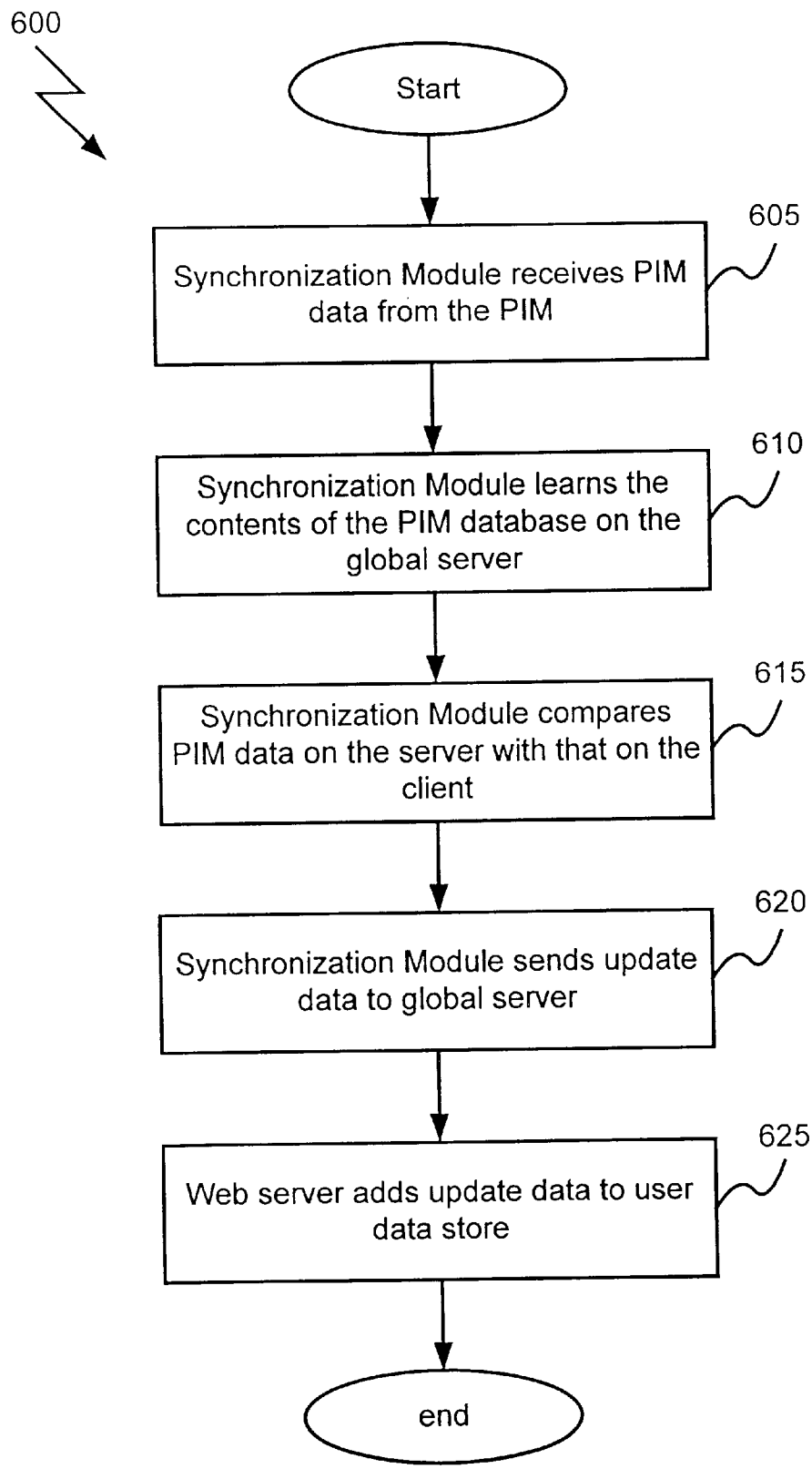
FIG. 6 is a flowchart illustrating the synchronization mode of one-way data merging.
Figure 7:
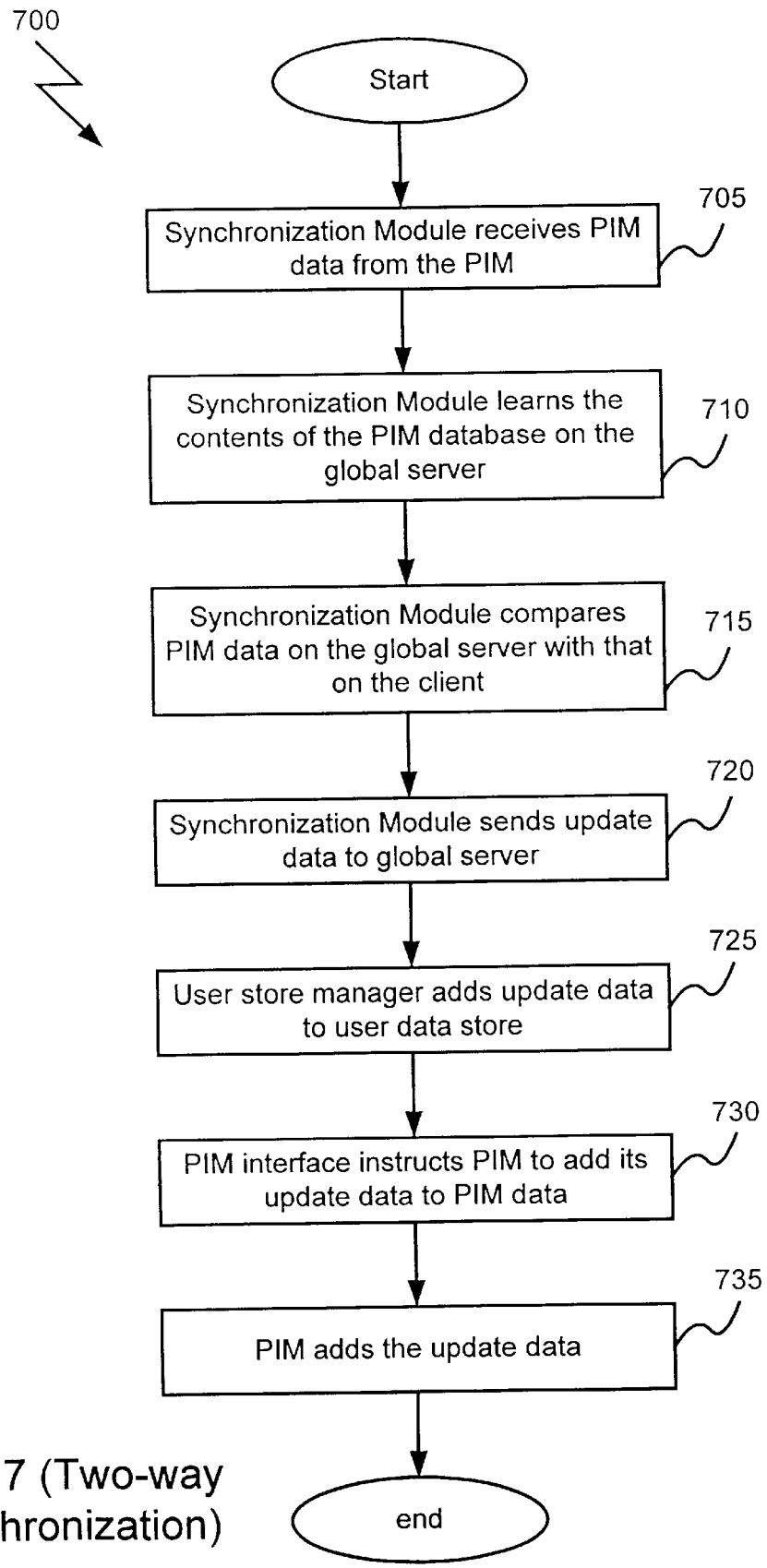
FIG. 7 is a flowchart illustrating the synchronization mode of two-way data synchronization.

The user interface 305 enables a user to designate workspace data to synchronize, enables a user to select a synchronization mode (one-way replace, one-way merge or two-way synchronize), and enables a user to initiate synchronization. Examples of the different modes of synchronization are illustrated in FIG. 5, FIG. 6 and FIG. 7, respectively. Designating workspace data to synchronize causes the web server 140 to maintain a separate database (e.g., database 830) in the user data store (e.g., user#1 store 805) corresponding to the identified user (e.g., user#1), as illustrated in FIG. 8. For example, the user may select the user's business address data maintained by the Outlook™ address book for synchronization. The synchronization module 325 will recognize this database for synchronization. The web server 140 determines whether a corresponding database already exists. If not, then the web server 140 will create a corresponding empty database and add the empty database to the user data store 150.

The first PIM interface 310 includes program code for enabling the PIM Downloadable 145 to communicate with the first PIM 155. Moreover, the first PIM interface 310 requests the first PIM 155 to retrieve the appropriate databases of the first PIM data 160 for synchronization. The first PIM 155 responsively retrieves the appropriate databases and passes them to the PIM Downloadable 145. Alternatively, the first PIM 155 informs the PIM Downloadable 145 of the locations of the appropriate databases.

The second PIM client interface 315 includes program code for enabling the PIM Downloadable 145 to communicate with the second PIM client 165. Moreover, the second PIM client interface 315 requests the second PIM client 165 to retrieve the appropriate databases of the second PIM data 170 and of the second PIM data 185. The second PIM client 165 responsively retrieves the appropriate workspace data from second PIM data 170 and requests the second PIM server 180 to retrieve the appropriate workspace data from second PIM data 185. The second PIM client 165 passes the workspace data from the second PIM data 170 and from the second PIM data 185 to the PIM Downloadable 145. Alternatively, the second PIM client 165 may inform the PIM Downloadable 145 of the locations of the databases on the second PIM data 170 and on the second PIM data 185. As another alternative, the second PIM client 165 may retrieve the appropriate workspace data from the second PIM data 185 on the second PIM PC 125, and store them locally with the second PIM data 170. The second PIM client 165 may then inform the PIM Downloadable 145 of the locations of the appropriate databases. It will be appreciated that other methods of enabling the PIM Downloadable 145 to access the workspace data are also possible. It will be appreciated that the second PIM client interface 315 may be included in a separate PIM Downloadable 145, which has second instances of the user interface 305, the communications engine 320 and the synchronization module 325.

The communications engine 320 includes program code for enabling the PIM Downloadable 145 to communicate with the web server 140, optionally via the browser 175.

Upon request, the synchronization module 325 instructs the first PIM interface 310 or the second PIM client interface 315 to perform its services for retrieving the workspace data to be synchronized. The synchronization module 325 also requests the web server 140 to retrieve the workspace data from the user data store 150 on the global server 105, and to pass the information via the Internet to the local client 120. Alternatively, if a previously status of the database stored on the global server 105 is known, then the synchronization module 325 may request only the changes made since then. In any case, the synchronization module 325 need only learn the content of the corresponding database stored in the user data store 250 on the global server 105. The synchronization module 325 compares the data contained in the local client 120 database with the data contained in the corresponding global server 105 database, and accordingly performs a synchronizing response. The three modes of synchronization, i.e., one-way merge, one-way replace and two-way synchronization, are illustrated and described below with reference to FIGS. 5, 6 and 7. It will be appreciated that the synchronization module 325 need not learn the contents contained in the corresponding database stored in the user data store 150 on the global server 105 when performing a one-way replace operation (since the contents are overwritten and thus irrelevant).

Figure 3B:
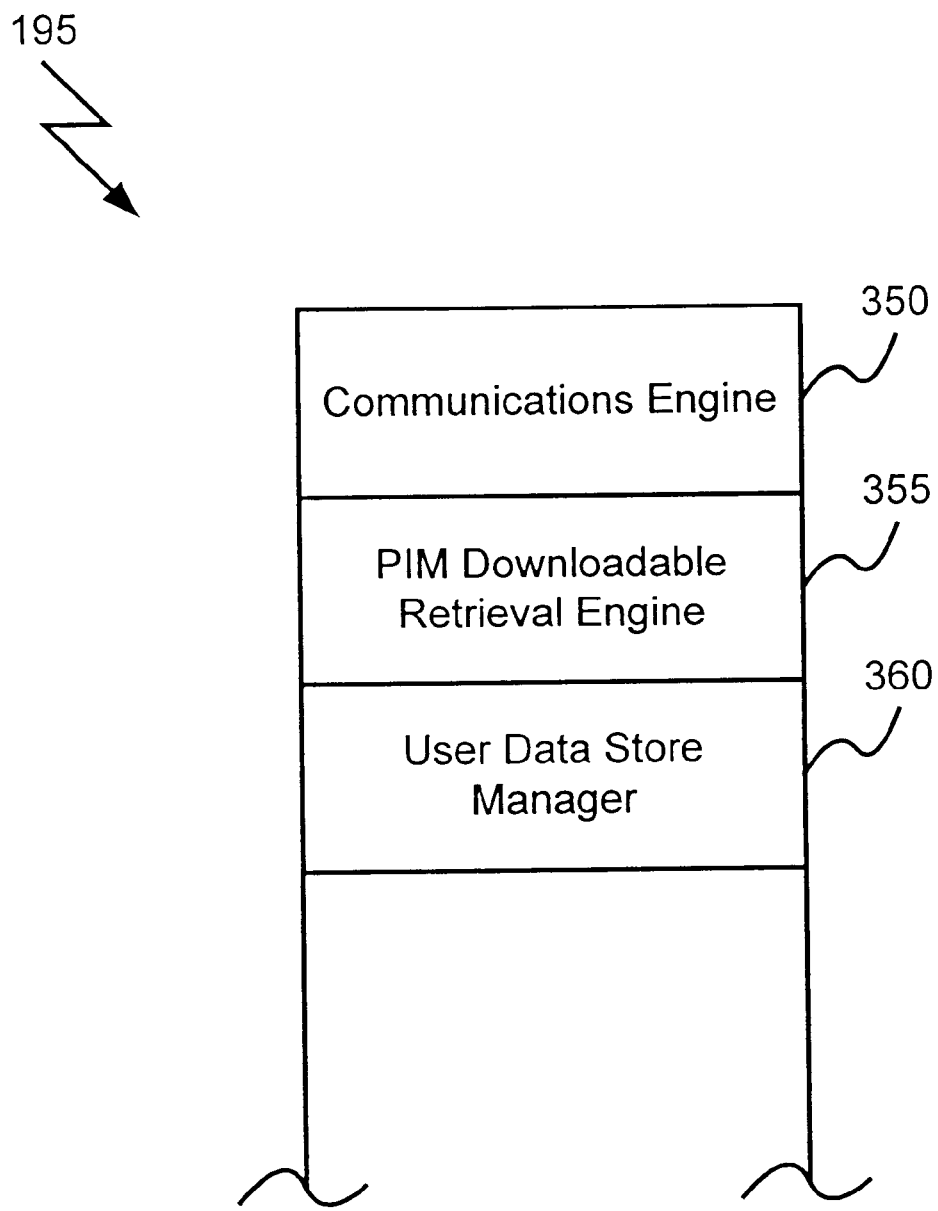
FIG. 3B is a block diagram illustrating details of the update engine of FIG. 1.

FIG. 3B is a block diagram illustrating details of the update engine 195. The update engine includes a communications engine 350, a PIM Downloadable retrieval engine 355 and a user data store manager 360. The communications engine 350 communicates with the communications engine 320 of the PIM Downloadable 145. The PIM Downloadable retrieval engine 355 receives requests for synchronization capability from the local client 120. Each request may identify the particular PIM or alternatively may identify the service such as address book, calendar or e-mail for which synchronization is desired. If only the service is identified, the PIM Downloadable retrieval engine 355 determines the PIM based on a previous selection corresponding to the service identified. The user data store manager 360 controls retrieval and manipulation of workspace data contained in the user data store 150. That is, the user data store manager 360 retrieves workspace data for the server database identified by the PIM Downloadable 145 as the database to be synchronized. The user data store manager 360 forwards the corresponding workspace data to the PIM Downloadable 145 for comparison with the database maintained by the PIM. The user data store manager 360 also modifies the server database based on update data received from the PIM Downloadable 145.

Figure 4:
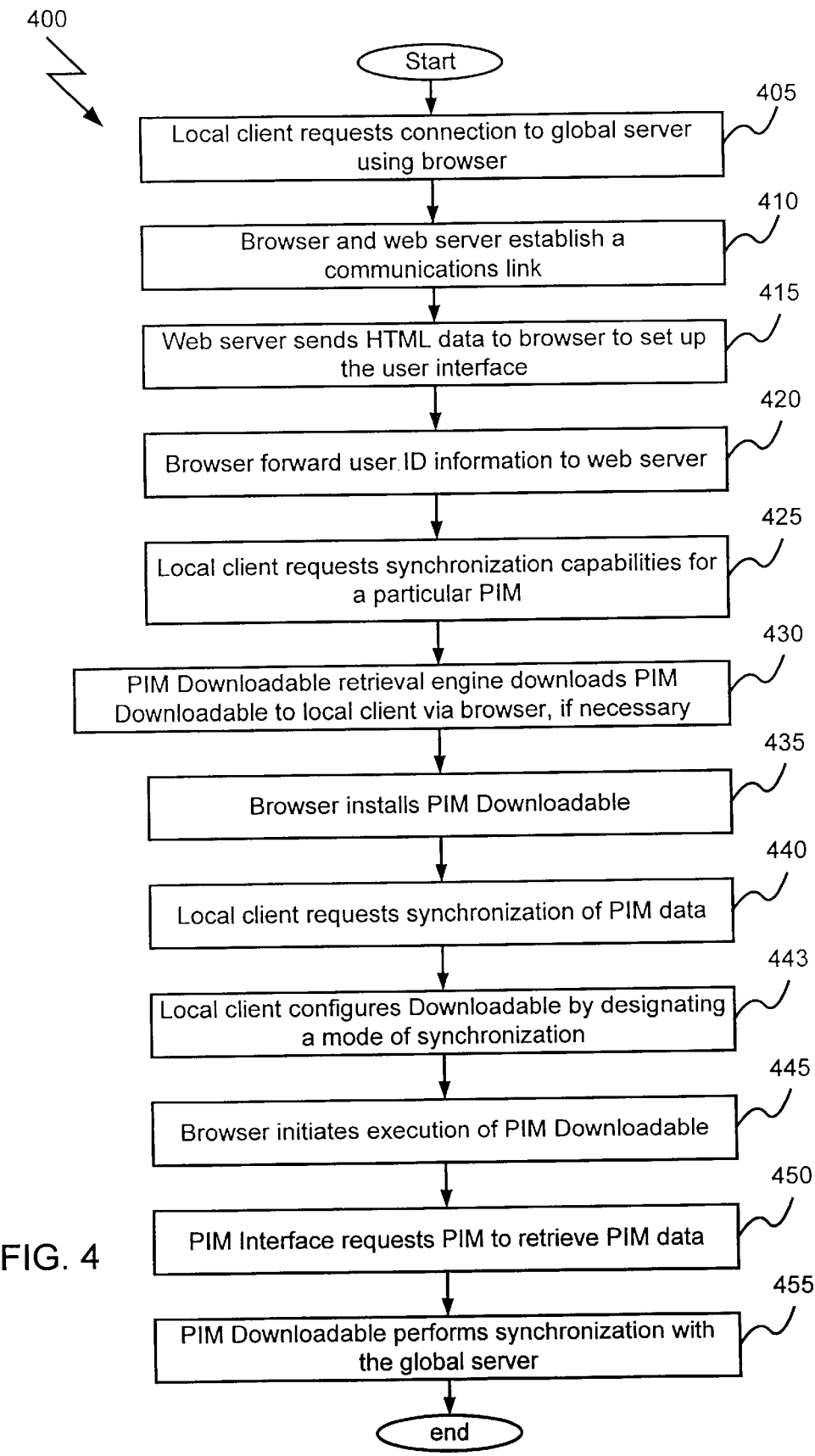
FIG. 4 is a flowchart illustrating a method of updating the global server, in accordance with the present invention.

FIG. 4 is a flowchart illustrating a method 400 of synchronizing PIM data with a global server 105, in accordance with the present invention. Method 400 starts with the local client 120 in step 405 requesting a connection to the global server 105 using the browser 175 and common URL technology. The browser 175 and web server 140 in step 410 establish a communications link. The web server 140 in step 415 sends HTML data to the browser 175 for setting up a user interface, which may include a request for user identification and authentication information. The browser 175 in step 420 sends the user identification and authentication information to the web server 140, which identifies and authenticates the user.

The local client 120 in step 425 requests synchronization capabilities for a particular PIM, such as for the first PIM 155. The PIM Downloadable retrieval engine 355 in step 430 downloads a PIM Downloadable 145 corresponding to the particular PIM to the local client 105 via the browser 175, if necessary. That is, if the downloadable 145 has already been downloaded or stored on the local client 105, then the step 430 is unnecessary. The browser 175 in step 435 installs the PIM Downloadable 145. Installing the downloadable 145 may include moving the downloadable to working memory for execution. The local client 105 in step 440 requests synchronization of a particular PIM database. The local client 120 in step 443 configures the PIM Downloadable 145 by selecting one of three available modes of synchronization, described in detail with reference to FIGS. 5–7, although other modes are possible. The browser 175 in step 445 initiates execution of the PIM Downloadable 145. The PIM interface corresponding to the PIM maintaining the database (e.g., the first PIM interface 310) in step 450 requests the PIM (e.g., the first PIM 155) to retrieve the PIM workspace data (e.g., the PIM data 160 contained within the PIM database). The PIM Downloadable 145 in step 455 performs synchronization with the global server 105 according to the synchronization mode selected above in step 440. Method 400 then ends.

FIG. 5 is a flowchart illustrating a method 500 of replacing data, referred to herein as a "replacement synchronization mode." Method 500 illustrates a first example for performing step 455. Method 500 begins with the synchronization module 325 in step 505 receiving the PIM data for the selected database from the PIM, e.g., the first PIM 155. The synchronization module 325 in step 510 uses the communications module to forward the PIM data to the web server 140. The user data store manager 360 in step 515 replaces the workspace data of the selected database in the user data store 150 with the forwarded workspace data. Method 500 then ends.

For example, if the database maintained by the PIM contains exactly records A, B and D, then regardless of the contents of the database on the global server 105 the synchronization module 325 will upload elements A, B and D to the global server 105. The user data store manager 360 will replace the workspace data on the global server 105 with the uploaded workspace data. Accordingly, both the database maintained by the global server 105 and the database maintained by the PIM will store exactly records A, B and D.

FIG. 6 is a flowchart illustrating a method 600 of merging data, referred to herein as a "merging synchronization mode." Method 600 illustrates a second example for performing step 455. Method 600 begins with the synchronization module 325 in step 605 receiving the PIM data for the selected database from the PIM, e.g., the first PIM 155. The synchronization module 325 in step 610 learns the contents of the corresponding database on the global server 105. Learning the contents of the database on the global server 105 may include downloading the entire contents of the database, or using software cache technology to download the differences from the last download. The synchronization module 325 in step 615 compares the database contents to determine update data indicating how the database maintained by the PIM was modified (updated) relative to the database maintained on the global server 105. For example, records may have been deleted, added or modified since the last connection, documents may have been modified since the last connection, etc. The synchronization module 325 in step 620 instructs the communications module to send the update data to the global server 105. The user data store manager 360 in step 625 adds (manipulates, etc.) the update data to the database in the user data store 150. Method 600 then ends.

For example, the database maintained by the PIM may include records A, B and D and the database maintained by the global server 105 may include records A, B and C. The synchronization module 325 compares the contents of the databases to learn that the database maintained by the global server 105 does not include record D. Thus, the synchronization module 325 forwards record D to the global server 105, which stores the record in the corresponding database. Accordingly, the database maintained by the global server 105 will contain records A, B, C and D, and the database maintained by the PIM will contain records A, B and D.

For another example, the database maintained by the PIM may have included records A, B, C and D and the database on the global server may include records A, B, C and D. If record C is deleted, the synchronization module 325 will determine based on version information that the record C has been deleted. Accordingly, the synchronization module 325 may do nothing so that a superset is maintained on the global server 105. Thus, the database on the global server 105 will contain records A, B, C and D, and the database maintained by the PIM will contain records A, B and D. Alternatively, the synchronization module 325 may inform the web server 140 that record C has been deleted, and the user data store manager 360 may delete record C from the corresponding database on the global server 105. In this case, the database maintained by the global server 105 and the database maintained by the PIM will each contain records A, B and D.

FIG. 7 is a flowchart illustrating a method 700 of performing two-way synchronization, referred to herein as "two-way synchronization mode." Method 700 begins with the synchronization module 325 in step 705 receiving the PIM data for the selected database from the PIM, e.g., the first PIM 155. The synchronization module 325 in step 710 learns the contents of the corresponding database on the global server 105. The synchronization module 325 in step 715 compares the workspace data from the database to determine update data indicating how the database maintained by the PIM was updated relative to the database maintained on the global server 105 and update data indicating how the database on the global server was updated relative to the database maintained by the PIM. As stated above, workspace data in the database maintained by the PIM may have been deleted, added or modified. The synchronization module 325 in step 720 sends the update data to the global server 105. The user data store manager 360 in step 725 adds the update data to the database in the user data store 150. The PIM interface, e.g., the first PIM interface 310, in step 730 instructs the PIM, e.g., the first PIM 155, to add its update information to PIM data 160 in the appropriate database. The PIM in step 735 adds the update data to the database. Method 700 then ends.

For example, the database maintained by the PIM may include records A, B and D and the database on the global server 105 may include records A, B and C. The synchronization module 325 will compare the workspace data to learn that the database maintained by the PIM does not include record C and that the database on the global server 105 does not include the record D. Accordingly, the synchronization module 325 will send record D to the global server 105 and the PIM interface will instruct the PIM to store record C in the appropriate database.

The foregoing description of the preferred embodiments of the present invention is by way of example only, and other variations and modifications of the above-described embodiments and methods are possible in light of the foregoing teaching. For example, although the invention has been described with reference to browsers, any web engine for communicating with a web server may alternatively be used.

Although the system has been described as having only two PIMs (and thus only two PIM interfaces, only two PIM downloadables, etc.), one skilled in the art will recognize that any number of PIMs may be managed by the system and methods of the present invention. Although the workspace data has been defined mostly in terms of email, calendar, bookmarks, etc, one skilled in the art will recognize that workspace data may include other types of data such as files, financial transactions, etc. Although the PIM Downloadable has been described as including a PIM interface to communicate with a PIM to obtain data to be synchronized, one skilled in the art will recognize that, if the Downloadable knows the location of the data, no PIM interface is needed. Thus, the downloadable may use an engine for retrieving the data from the known location without the assistance of a PIM. Although the network sites are being described as separate and distinct sites, one skilled in the art will recognize that these sites may be a part of an integral site, may each include portions of multiple sites, or may include combinations of single and multiple sites. Although each of the network sites is being described as a single computer, one skilled in the art will recognize that each site may include multiple computers. Further, components of this invention may be implemented using a programmed general purpose digital computer, using application specific integrated circuits, or using a network of interconnected conventional components and circuits. Connections may be wired, wireless, modem, etc. The embodiments described herein are not intended to be exhaustive or limiting. The present invention is limited only by the following claims.

What is claimed is:

1. A computer-based method, comprising the steps of:
using a browser to receive identification of a downloadable from a computer network;
initiating execution of the downloadable;
receiving information designating workspace data to be synchronized and designating a synchronization mode;
using the Downloadable to instruct a personal information manager (PIM) to retrieve the workspace data to be synchronized;
using the Downloadable to determine first update data based on the workspace data to be synchronized and on the synchronization mode; and
using the Downloadable to deliver the first update data to a server database connected to the computer network.

2. The method of claim 1, wherein the synchronization mode is one of one-way replace, one-way merge and two-way synchronization.

3. The method of claim 1, further comprising the steps of communicating with the server database to learn the server database contents associated with the workspace data to be synchronized, and comparing the server database contents and the workspace data to be synchronized.

4. The method of claim 3, wherein the step of determining first update data is based on the comparison.

5. The method of claim 4, further comprising the steps of determining second update data based on the comparison, and instructing the PIM to modify the workspace data to be synchronized by the second update data.

6. The method of claim 1, further comprising the step of downloading the downloadable from the server database.

7. A system, comprising:
means for using a browser to receive identification of a downloadable from a computer network;
means for initiating execution of the downloadable;
means for receiving information designating workspace data to be synchronized and designating a synchronization mode;

means for using the Downloadable to instruct a personal information manager (PIM) to retrieve the workspace data to be synchronized;

means for using the Downloadable to determine first update data based on the workspace data to be synchronized and on the synchronization mode; and means for using the Downloadable to deliver the first update data to a server database connected to the computer network.

8. A computer-readable storage medium storing program code for causing a computer to perform the steps of:

using a browser to receive identification of a downloadable from a computer network;

initiating execution of the downloadable;

receiving information designating workspace data to be synchronized and designating a synchronization mode;

using the Downloadable to instruct a personal information manager (PIM) to retrieve the workspace data to be synchronized;

using the Downloadable to determine first update data based on the workspace data to be synchronized and on the synchronization mode; and using the Downloadable to deliver the first update data to a server database connected to the computer network.

9. A system, comprising:

a downloadable including
  a user interface for receiving information designating workspace data to be synchronized and designating a synchronization mode;
  a PIM interface for instructing a personal information manager (PIM) to retrieve the workspace data to be synchronized;
  a synchronization module coupled to the user interface and the PIM interface for determining first update data based on the workspace data to be synchronized and on the synchronization mode; and
  a communications engine coupled to the synchronization module for delivering the first update data to a server database; and a browser for receiving identification of the downloadable from a computer network, and for initiating execution of the downloadable.

10. The system of claim 9, wherein the synchronization mode is one of one-way replace, one-way merge and two-way synchronization.

11. The system of claim 9, wherein the synchronization module learns the server database contents corresponding to the workspace data to be synchronized, and compares the server database contents and the workspace data to be synchronized.

12. The system of claim 11, wherein the synchronization module determines the first update data based on the comparison.

13. The system of claim 12, wherein the synchronization module determines second update data based on the comparison, and instructs the PIM to modify the workspace data to be synchronized by the second update data.

14. The system of claim 9, wherein the Downloadable is downloaded from the server database.

15. Program code embodied in a carrier wave for controlling a computer to perform the steps of:

receiving information designating workspace data to be synchronized and a synchronization mode;

instructing a personal information manager (PIM) to retrieve the workspace data to be synchronized;

determining first update data based on the workspace data to be synchronized and on the synchronization mode; and delivering the first update data to a server database.

16. A computer-based method, comprising the steps of:

storing workspace data and a Downloadable;

establishing a communications link with a client;

receiving a request for synchronization capability from a client;

forwarding the Downloadable which includes the synchronization capability to the client for installation;

receiving update data from the Downloadable; and updating the workspace data based on the update data received.

17. The method of claim 16, wherein the method is performed by a server coupled via a network to the client.

18. The method of claim 16, wherein the workspace data is contained in a user data store.

19. The method of claim 16, wherein the step of establishing a communications link with a client includes using URL technology.

20. The method of claim 16, wherein the request for synchronization capability includes information identifying a particular PIM for which synchronization is desired.

21. The method of claim 20, wherein the information includes identification of a service, and wherein the particular PIM corresponding to the service is known.

22. The method of claim 21, further comprising the step of retrieving a Downloadable corresponding to the particular PIM.

23. The method of claim 22, wherein the Downloadable retrieved includes an interface to the particular PIM.

24. The method of claim 16, wherein the Downloadable includes a user interface for enabling a user to select a synchronization mode and to designate a database containing workspace data to be synchronized.

25. The method of claim 16, wherein the Downloadable includes a synchronization module for computing the update data.

26. The method of claim 25, wherein the synchronization module computes the update data based on one of one-way replace, one-way merge and two-way synchronization.

27. A system, comprising:

means storing workspace data and a Downloadable;

means for establishing a communications link with a client;

means for receiving a request for synchronization capability from the client;

means for forwarding a Downloadable which includes the synchronization capability to the client for installation;

means for receiving update data from the Downloadable; and means for updating the workspace data based on the update data received.

28. A system, comprising:

memory storing workspace data and a PIM Downloadable;

a web server for establishing a communications link with a client;

a personal information manager (PIM) Downloadable retrieval engine coupled to the memory for receiving a request for synchronization capability from the client, and for forwarding the PIM Downloadable which includes the synchronization capability to the client for installation; and a user data store manager coupled to the memory for receiving update data from the Downloadable, and for updating the workspace data based on the update data received.

29. The system of claim 28, wherein the workspace data is contained in a user data store.

30. The system of claim 28, wherein the web server establishes a communications link with a client using URL technology.

31. The system of claim 28, wherein the request for synchronization capability includes information identifying a particular PIM for which synchronization is desired.

32. The system of claim 31, wherein the information includes identification of a service, and wherein the particular PIM corresponding to the service is known.

33. The system of claim 32, wherein the memory stores a plurality of PIM Downloadables and wherein the PIM Downloadable retrieval engine retrieves a Downloadable corresponding to the particular PIM.

34. The system of claim 33, wherein the PIM Downloadable retrieved includes an interface to the particular PIM.

35. The system of claim 28, wherein the PIM Downloadable includes a user interface for enabling a user to select a synchronization mode and to designate a database containing the workspace data to be synchronized.

36. The system of claim 28, wherein the Downloadable includes a synchronization module for computing the update data.

37. The system of claim 36, wherein the synchronization module computes the update data based on one of one-way replace, one-way merge and two-way synchronization.

38. A computer-based method, comprising the steps of:
establishing a communications link with a server storing workspace data;
receiving identification of a PIM Downloadable;
executing the PIM Downloadable to instruct a personal information manager (PIM) to retrieve PIM data; and
executing the PIM Downloadable to update the workspace data stored on the server based on the retrieved PIM data.

39. The method of claim 38, further comprising the step of requesting synchronization capability for a particular PIM.

40. The method of claim 39, further comprising the steps of receiving and installing the PIM Downloadable from the server.

41. The method of claim 38, wherein the PIM Downloadable has already been installed.

42. The method of claim 39, wherein the step of requesting synchronization capability includes information identifying a particular PIM for which synchronization is desired.

43. The method of claim 42, wherein the information includes identification of a service, and wherein the particular PIM corresponding to the service is known.

44. The method of claim 38, wherein the PIM Downloadable includes an interface to the PIM.

45. The method of claim 38, wherein the PIM Downloadable includes a user interface for enabling a user to select a synchronization mode and to designate a database containing the workspace data to be synchronized.

46. The method of claim 38, wherein the Downloadable includes a synchronization module for computing the update data.

47. The method of claim 46, wherein the synchronization module computes the update data based on one of one-way replace, one-way merge and two-way synchronization.

48. A system, comprising:
an installed PIM interface downloadable associated with the identification for instructing a PIM to retrieve PIM data;
an installed synchronization module downloadable coupled to the PIM interface for determining update data based on the PIM data retrieved, and for forwarding the update data to the server to update the workspace data; and
a browser for establishing a communications link with a server storing workspace data, for receiving identification of the PIM interface downloadable and the synchronization module downloadable, and for initiating execution of the downloadables.

49. A method, comprising the steps of:
using a browser to receive identification of a downloadable from a computer network;
initiating execution of the downloadable;
receiving information designating workspace data to be synchronized and designating a synchronization mode;
using the Downloadable to retrieve the workspace data to be synchronized;
using the Downloadable to determine first update data based on the workspace data to be synchronized and on the synchronization mode; and
using the Downloadable to deliver the first update data to a server database connected to the computer network.

* * * * *